Figure 1:
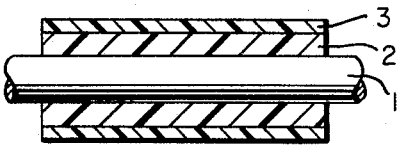
Figure 2:
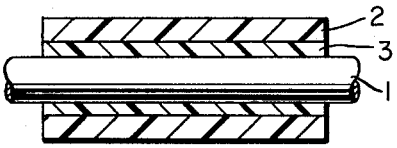
Figure 3:
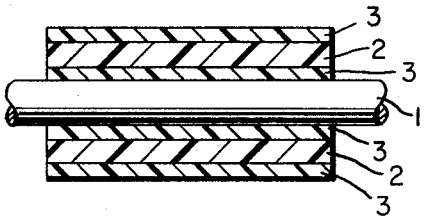

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 6

T904,006

METAL CONDUCTOR HAVING ALTERNATE LAYERS OF AN AROMATIC POLYAMIDE ENAMEL AND AN ACRYLIC WIRE ENAMEL

George P. Mell, Newtown Square, Pa., assignor to E. I. du Pont de Nemours and Company, Wilmington, Del.

Continuation of abandoned application Ser. No. 883,510, Dec. 9, 1969. This application Nov. 19, 1971, Ser. No. 200,571

Int. Cl. H01b *3/44;* B44d *1/18*

U.S. Cl. 117—218

1 Sheet Drawing. 28 Pages Specification

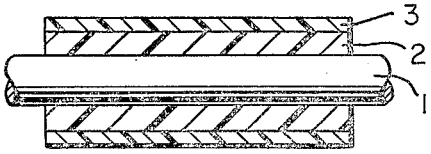

A metal conductor coated with multiple layers of an aromatic polyamide and an acrylic polymer is the subject of this invention wherein (A) the aromatic polyamide has the following recurring structural unit:

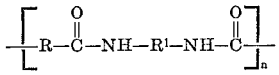

wherein R is either

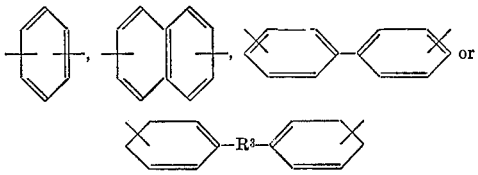

and $R^1$ is either

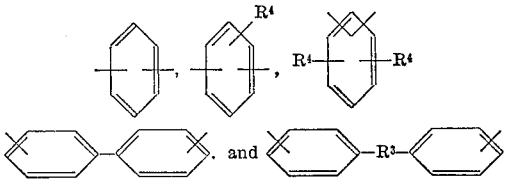

wherein $R^3$ is either an alkylene radical having 1–3 carbon atoms, $$-\overset{O}{\overset{\|}{C}}-,\ -O-,\ -S-\ \text{or}\ -SO_2-$$

and $R^4$ is an alkyl group of 1–3 carbon atoms and $n$ is a positive integer sufficiently high to provide a film-forming polymer having an inherent viscosity at 25° C. of at least 0.15 measured at about 0.5% polymer solids in N-methyl pyrrolidone;

(B) the acrylic polymer is (a) 1–15% by weight of at least one $\alpha,\beta$-unsaturated carboxylic acid, (b) 30–80% by weight of at least one nitrile of the formula $$CH_2=\overset{R^6}{\overset{|}{C}}-CN$$

wherein $R^6$ is either hydrogen and methyl, and (c) 15–65% by weight of an alkyl acrylate or an alkyl methacrylate having 1–12 carbon atoms in the alkyl groups;

the novel multi-layered metal conductor of this invention has excellent electrical and physical properties, such as a high dielectric strength, a high cut-through temperature, excellent abrasion resistance and flex resistance, and in particular, has a low electrical dissipation factor at elevated temperatures.

Nov. 7, 1972 G. P. MELL T904,006

METAL CONDUCTOR HAVING ALTERNATE LAYERS OF AN AROMATIC POLYAMIDE ENAMEL AND AN ACRYLIC WIRE ENAMEL

Original Filed Dec. 9, 1969

INVENTOR

GEORGE P. MELL

BY Hilmar L. Fricke

ATTORNEY